US009202257B2

(12) United States Patent
Mehta et al.

(10) Patent No.: US 9,202,257 B2
(45) Date of Patent: Dec. 1, 2015

(54) SYSTEM FOR DETERMINING AN ILLEGITIMATE THREE DIMENSIONAL VIDEO AND METHODS THEREOF

(71) Applicant: Infosys Limited, Bangalore (IN)

(72) Inventors: Sachin Mehta, Distt. Kangra (IN); Rajarathnam Nallusamy, Trichy Dist. (IN)

(73) Assignee: Infosys Limited, Bangalore (IN)

( * ) Notice: Subject to any disclaimer, the term of this patent is extended or adjusted under 35 U.S.C. 154(b) by 0 days.

(21) Appl. No.: 14/494,303

(22) Filed: Sep. 23, 2014

(65) Prior Publication Data

US 2015/0170312 A1 Jun. 18, 2015

(30) Foreign Application Priority Data

Dec. 12, 2013 (IN) .................................. 5744/2013

(51) Int. Cl.
  *G06K 9/36* (2006.01)
  *G06T 9/00* (2006.01)
  *G06T 1/00* (2006.01)
  *G06K 9/00* (2006.01)

(52) U.S. Cl.
  CPC .......... *G06T 1/0021* (2013.01); *G06K 9/00765* (2013.01); *G06T 1/0085* (2013.01); *G06T 2201/0064* (2013.01); *G06T 2207/10012* (2013.01)

(58) Field of Classification Search
  None
  See application file for complete search history.

(56) References Cited

U.S. PATENT DOCUMENTS

2011/0064262 A1   3/2011   Chen et al.
2012/0148089 A1*  6/2012   Vashistha et al. ............. 382/100

FOREIGN PATENT DOCUMENTS

EP   2426636 A1   8/2011
WO   2007032758 A1   3/2007

OTHER PUBLICATIONS

Chung, K, et al., "On SVD-Based Watermarking Algorithm", Applied Mathematics and Computation, 188:54-57 (2007).

* cited by examiner

*Primary Examiner* — Brian P Werner
(74) *Attorney, Agent, or Firm* — LeClairRyan, a Professional Corporation

(57) ABSTRACT

A method, non-transitory computer readable medium, and video analyzing computing device that generates a scene averaged frame value for each scene of an original video and a each scene of a resembling video. Each of a subset of the scenes of the resembling video is mapped to a corresponding scene of the original video based on a comparison of the scene averaged frame values. A singular value score is generated for each frame of each of the subset of scenes of the resembling video and each frame of the corresponding one of the scenes of the original video is generated. Matching one(s) of the one or more frames of each of the at least a subset of scenes of the resembling video is identified based on a comparison of at least a subset of the singular value scores. A first watermark is extracted from the identified matching frames.

15 Claims, 6 Drawing Sheets

(PRIOR-ART)

(PRIOR-ART)

(PRIOR-ART)

SYSTEM FOR DETERMINING AN ILLEGITIMATE THREE DIMENSIONAL VIDEO AND METHODS THEREOF

This application claims the benefit of Indian Patent Application No. 5744/CHE/2013 filed Dec. 12, 2013, which is hereby incorporated by reference in its entirety.

FIELD

The present invention relates to the field of multimedia security. In particular, the present invention provides a computer-implemented method, system, and computer readable medium for determining an illegitimate three dimensional video.

BACKGROUND

With the advancement in display technology, circuit design, and signal processing, it has become feasible to capture and render three dimensional (3D) videos on consumer platforms. A video is a sequence of scenes and a scene is a sequence of images called frames. Three dimensional videos have been recognized as one of the essential parts of next-generation visual media. Three dimensional videos may be represented using either stereo image recording (hereinafter may be referred to as 'SIR') or depth-image-based rendering (hereinafter may be referred to as 'DIBR'). In SIR, left and right views for the same scene are captured simultaneously using different camera positions. Although the video is of a high quality, there are several drawbacks which limit its applicability in real-time applications. Firstly in SIR, both the cameras should have same parameters such as contrast, height, and brightness. It is very difficult and costly to set both the cameras with same parameters. DIBR, on the other hand, requires one center view and corresponding depth map. Virtual left and right views are generated by mapping the center view with its corresponding depth map to provide three dimensional experiences. In contrast to SIR, it offers several advantages. Firstly, depth degree is adjustable in the DIBR systems which help the viewers to adjust the depth condition they prefer. As the depth map is an 8-bit gray scale image, it requires less storage space and low transmission bandwidth. Further, center view video consists of color frames and can be used independently as two dimensional video i.e. DIBR systems have backward compatibility with the widely used two dimensional systems.

The convergence of networks, devices, and services combined with the technological advancements in digital storage, multimedia compression, and miniaturization of digital cameras has led to an explosive growth of online video content. In addition to the professionally produced video content, user-generated content and content produced by hardcore amateurs are also on the rise. Videos can easily be shared over the Internet using popular video sharing sites such as You Tube® and Yahoo!® Video. Three dimensional videos can be illegally distributed in multiple ways, including, but not limited to, unauthorized distribution of both the center video as well as depth video, unauthorized distribution of center video and unauthorized distribution of either left or right synthesized view. Although the user experience is enhanced with the new means of content production, distribution, and monetization, it has made illegal reproduction and distribution of digital content easier. Piracy of digital media content is increasing day by day and is a major cause of worry for the digital content owners. To protect the authenticity of three dimensional videos, a number of watermarking algorithms have been proposed. Watermarking is the process of embedding a watermark into an object such as a video which can be extracted later on from the suspected files for proving the digital rights.

To protect the copyright of three dimensional videos, few watermarking techniques have been proposed. Although a number of techniques exist for two dimensional watermarking, the mechanism to create and render two dimensional videos cannot be extrapolated to three dimensional videos since the nature of three dimensional videos differ from that of two dimensional videos. Three dimensional videos have depth-image-based rendering. DIBR videos have center view and depth map which are synthesized to generate left and right views to provide 3D experience. Koz et al. has proposed a watermarking scheme for the copyright protection of SIR three dimensional videos. The method is able to extract the watermark from known and unknown camera positions. Halici and Alatan have proposed a watermarking method for DIBR images. A watermark is embedded in spatial domain with a weighting factor. The method may not be robust against non-linear transformations such as rotation. Algorithms such as Singular Value Decomposition (hereinafter may be referred to as 'SVD') have gained importance due to its robustness to withstand attacks relative to algorithms such as Discrete Cosine Transform (hereinafter may be referred to as 'DCT') and Discrete Wavelet Transform (hereinafter may be referred to as 'DWT'). Various methods have been proposed to watermark digital images using SVD. However, the application of SVD in watermarking of videos is difficult. This limitation exists primarily due to temporal nature of videos, presence of special effects in videos, and non-blind nature of SVD based methods.

SUMMARY

A method for determining an illegitimate three dimensional video includes generating by a video analyzing computing device a first scene averaged frame value for each of a plurality of scenes of an original video and a second scene averaged frame value for each of a plurality of scenes of a resembling video. Each of at least a subset of the scenes of the resembling video is mapped by the video analyzing computing device to a corresponding one of the scenes of the original video based on a comparison of at least a subset of the first scene averaged frame values and the second scene averaged frame values. A first singular value score for each of one or more frames of each of the subset of scenes of the resembling video and a second singular value score for each of one or more frames of the corresponding one of the scenes of the original video is generated by the video analyzing computing device. One or more matching ones of the one or more frames of each of the at least a subset of scenes of the resembling video is identified by the video analyzing computing device based on a comparison of at least a subset of the first singular value scores and the second singular value scores. A first watermark is extracted by the video analyzing computing device from the identified matching frames.

A video analyzing computing device includes a processor and a memory coupled to the processor which is configured to be capable of executing programmed instructions including and stored in the memory to generate a first scene averaged frame value for each of a plurality of scenes of an original video and a second scene averaged frame value for each of a plurality of scenes of a resembling video. Each of at least a subset of the scenes of the resembling video is mapped to a corresponding one of the scenes of the original video based on a comparison of at least a subset of the first scene averaged frame values and the second scene averaged frame values. A first singular value score for each of one or more frames of each of the subset of scenes of the resembling video and a second singular value score for each of one or more frames of the corresponding one of the scenes of the original video is generated. One or more matching ones of the one or more frames of each of the at least a subset of scenes of the resembling video is identified based on a comparison of at least a subset of the first singular value scores and the second singular value scores. A first watermark is extracted from the identified matching frames.

A non-transitory computer readable medium having stored thereon instructions for testing a firewall includes executable code which when executed by a processor, causes the processor to perform steps including generating a first scene averaged frame value for each of a plurality of scenes of an original video and a second scene averaged frame value for each of a plurality of scenes of a resembling video. Each of at least a subset of the scenes of the resembling video is mapped to a corresponding one of the scenes of the original video based on a comparison of at least a subset of the first scene averaged frame values and the second scene averaged frame values. A first singular value score for each of one or more frames of each of the subset of scenes of the resembling video and a second singular value score for each of one or more frames of the corresponding one of the scenes of the original video is generated. One or more matching ones of the one or more frames of each of the at least a subset of scenes of the resembling video is identified based on a comparison of at least a subset of the first singular value scores and the second singular value scores. A first watermark is extracted from the identified matching frames.

This technology provides a number of advantages including providing more efficient and effective methods, non-transitory computer readable media, and devices for determining an illegitimate three dimensional video. In particular, this technology more effectively extracts a watermark from a potentially illegitimate three dimensional video to allow comparison with that of an original video.

BRIEF DESCRIPTION OF THE DRAWINGS

Features, aspects, and advantages of the present invention will be better understood when the following detailed description is read with reference to the accompanying drawings, wherein.

DETAILED DESCRIPTION

Disclosed embodiments provide computer-implemented method, system, and computer-readable media for determining illegitimate three dimensional videos with DIBR as rendering technology. While the particular embodiments described herein may illustrate the invention in a particular domain, the broad principles behind these embodiments could be applied in other fields of endeavor. To facilitate a clear understanding of this technology, illustrative examples are provided herein which describe certain aspects of the disclosure. However, it is to be appreciated that these illustrations are not meant to limit the scope of the disclosure and are provided herein to illustrate certain concepts associated with the disclosure.

The following description is full and informative description of the best method and system presently contemplated for carrying out this technology which is known to the inventors at the time of filing the patent application. Of course, many modifications and adaptations will be apparent to those skilled in the relevant arts in view of the following description in view of the accompanying drawings and the appended claims. While the systems and methods described herein are provided with a certain degree of specificity, this technology may be implemented with either greater or lesser specificity, depending on the needs of the user. Further, some of the features of this technology may be used to advantage without the corresponding use of other features described in the following paragraphs.

Any headings used herein are for organizational purposes only and are not meant to limit the scope of the description or the claims. As a preliminary matter, the definition of the term "or" for the purpose of the following discussion and the appended claims is intended to be an inclusive "or" That is, the term "or" is not intended to differentiate between two mutually exclusive alternatives. Rather, the term "or" when employed as a conjunction between two elements is defined as including one element by itself, the other element itself, and combinations and permutations of the elements. For example, a discussion or recitation employing the terminology "A" or "B" includes: "A" by itself, "B" by itself and any combination thereof, such as "AB" and/or "BA." As used herein, the word "may" is used in a permissive sense rather than the mandatory sense. Similarly, the words "include", "including", and "includes" mean including, but not limited to.

It is also to be understood that this technology may be implemented in various forms of hardware, software, firmware, special purpose processors, or a combination thereof. Preferably, this technology is implemented in software as a program tangibly embodied on a program storage device. The program may be uploaded to, and executed by, a machine comprising any suitable architecture. One or more of the above-described techniques may be implemented in or involve one or more computer systems.

Figure 1:
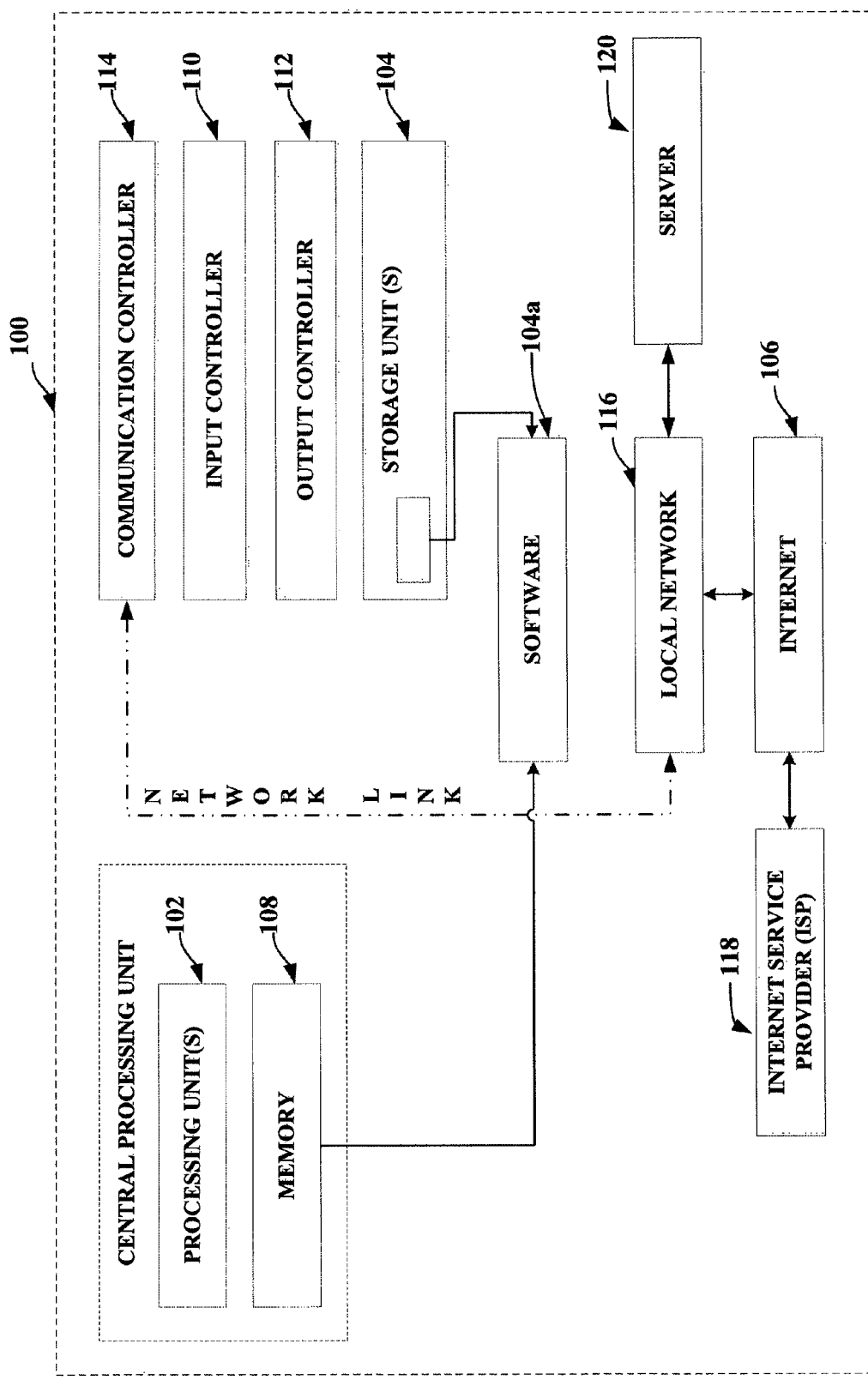
FIG. 1 is a block diagram of a computing device to which this technology may be applied according to an exemplary embodiment.

FIG. 1 is a block diagram of a video analyzing computing device 100 to which this technology may be applied according to an embodiment of this technology. The system includes at least one processor 102, designed to process instructions, for example computer readable instructions (i.e., code) stored on a storage device 104. By processing instructions, processing device 102 may perform the steps and functions disclosed herein. Storage device 104 may be any type of storage device, for example, but not limited to an optical storage device, a magnetic storage device, a solid state storage device and a non-transitory storage device. The storage device 104 may contain an application 104a which is a set of instructions (i.e. code). Alternatively, instructions may be stored in one or more remote storage devices, for example storage devices accessed over a network or the internet 106. The computing device 100 also includes an operating system and microinstruction code. The various processes and functions described herein may either be part of the microinstruction code or part of the program (or combination thereof) which is executed via the operating system. Computing device 100 additionally may have memory 108, an input controller 110, and an output controller 112 and communication controller 114. A bus (not shown) may operatively couple components of computing device 100, including processor 102, memory 108, storage device 104, input controller 110 output controller 112, and any other devices (e.g., network controllers, sound controllers, etc.). Output controller 112 may be operatively coupled (e.g., via a wired or wireless connection) to a display device (e.g., a monitor, television, mobile device screen, touch-display, etc.) in such a fashion that output controller 112 can transform the display on display device (e.g., in response to modules executed). Input controller 110 may be operatively coupled (e.g., via a wired or wireless connection) to input device (e.g., mouse, keyboard, touch-pad, scroll-ball, touch-display, etc.) in such a fashion that input can be received from a user. The communication controller 114 is coupled to a bus (not shown) and provides a two-way coupling through a network link to the internet 106 that is connected to a local network 116 and operated by an internet service provider (hereinafter referred to as 'ISP') 118 which provides data communication services to the internet. Members or subscribers of social media may be connected to the local network 116. A network link typically provides data communication through one or more networks to other data devices. For example, network link may provide a connection through local network 116 to a host computer, to data equipment operated by an ISP 118. A server 120 may transmit a requested code for an application through internet 106, ISP 118, local network 116 and communication controller 114. Of course, FIG. 1 illustrates computing device 100 with all components as separate devices for ease of identification only. Each of the components may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing device 100 may be one or more servers, for example a farm of networked servers, a clustered server environment, or a cloud network of computing devices.

A three dimensional DIBR video is essentially represented as video and depth. This format is eye-catching as inclusion of depth enables display independent solution for three dimensional that supports generation of an increased number of views, which may be required by different three dimensional displays. In DIBR video, depth data tells about the distance of the objects from the camera in the three dimensional view. DIBR systems wrap the center video data frame according to the values contained in the depth frame and fill the holes to synthesize left-eye and right-eye virtual views. Depth frames are pre-processed in order to generate more natural virtual views.

Figure 2:
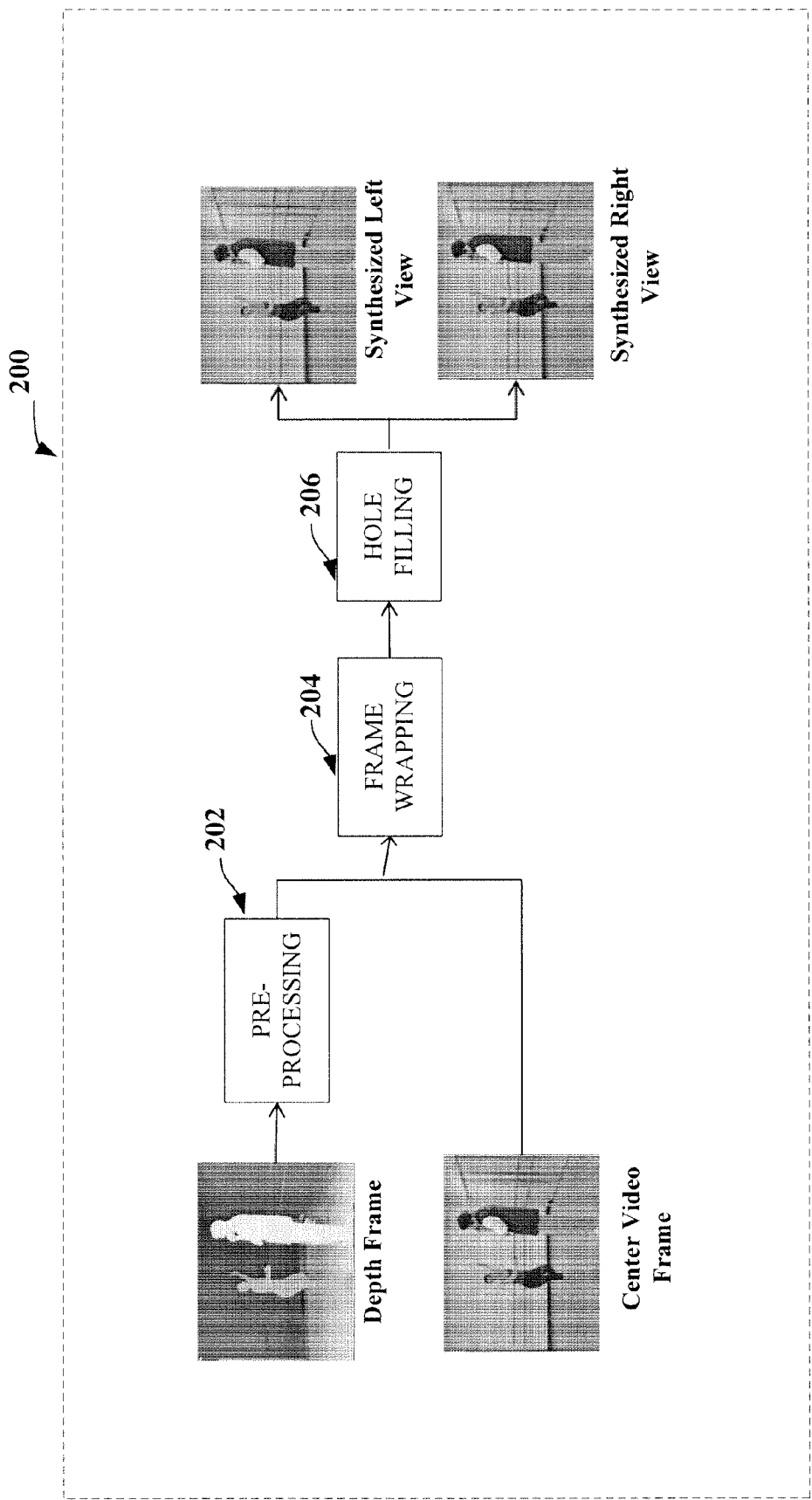
FIG. 2 is a block diagram illustrative of an exemplary process that can be employed to render three dimensional videos.

FIG. 2 is a block diagram illustrative of a process that can be employed to render three dimensional videos. The depth channel of a three dimensional video is pre-processed 202. Pre-processing 202 of depth channel is done to reduce the large holes so as to maintain the quality of virtually synthesized left and right views. The next step is the frame wrapping 204 which aims at generating the virtual left and right views by mapping the pixels of center video frame to the corresponding depth frame. The pixels in depth video frame range from $Z_{near}$ to $Z_{far}$, where $Z_{near}$ and $Z_{far}$ denotes the nearest and farthest planes in the 3D view. For an 8-bit depth map, the pixel value ranges from 0 to 255. The pixels of depth map are mapped with pixels of center video frame using below equations.

$$x_L = x_C + \left(\frac{t_x}{2} \times \frac{f}{z}\right) \quad \text{Equation I}$$

$$x_R = x_c - \left(\frac{t_x}{2} \times \frac{f}{z}\right) \quad \text{Equation II}$$

where $x_C$, and $x_R$, are $x_L$ the x-coordinate of the pixels in the center frame ($F_C$), synthesized right frame ($F_{VR}$) and synthesized left frame ($F_{VL}$) respectively. f is the focal length, $t_x$ is the baseline distance and Z is the value of the pixel indepth video frame ($D_C$) corresponding to center video frame pixel.

According to the visibility property of a three dimensional frame, the objects which are near will occlude the distant objects. Hence, farthest depth value pixels are wrapped first.

When center video frame is wrapped with corresponding depth frame, holes or disocclusions are revealed. Neither center video frame nor corresponding depth video frame contains any texture information about the holes or disocclusion area. To fill these newly exposed areas, hole filling 206 is applied using either an average filter or an interpolation. Known methods, for example, linear interpolation may be applied for filling the holes or disocclusions.

Disclosed systems and methods treat center video and depth as independent channels for the purpose of watermarking. It is assumed that any modification or alteration with the center video information will have similar impact on the depth information. Watermark is embedded independently in center video as well as depth video by employing a non-blind video watermarking algorithm such as SVD. SVD is a linear algebraic technique which optimally decomposes matrices to represent a maximum amount of signal energy in as few coefficients as possible. While using the SVD transformation a matrix is decomposed into three matrices U, S, and V. U and V are the orthogonal matrices and S is a diagonal matrix. The SVD is a technique that can be used in image compression techniques, but can also be applied to watermarking. The SVD is performed, after which the singular values are usually modified to embed the watermark. A pseudo-inverse SVD is then applied to obtain the original content. The proposed method specifically employs S component for embedding watermark in each channel. Video consists of several scenes and each scene consists of several frames. As the watermarking process is non-blind, an efficient mapping process is proposed to avoid such synchronization issues. Frames of the original video are mapped with the resembling video before extracting the watermark. The proposed method uses scene based mapping process at the watermark extractor side to map the possibly resembling frames with the original frames. The first step is watermark embedding procedure and the next step is watermark extracting procedure.

Figure 3:
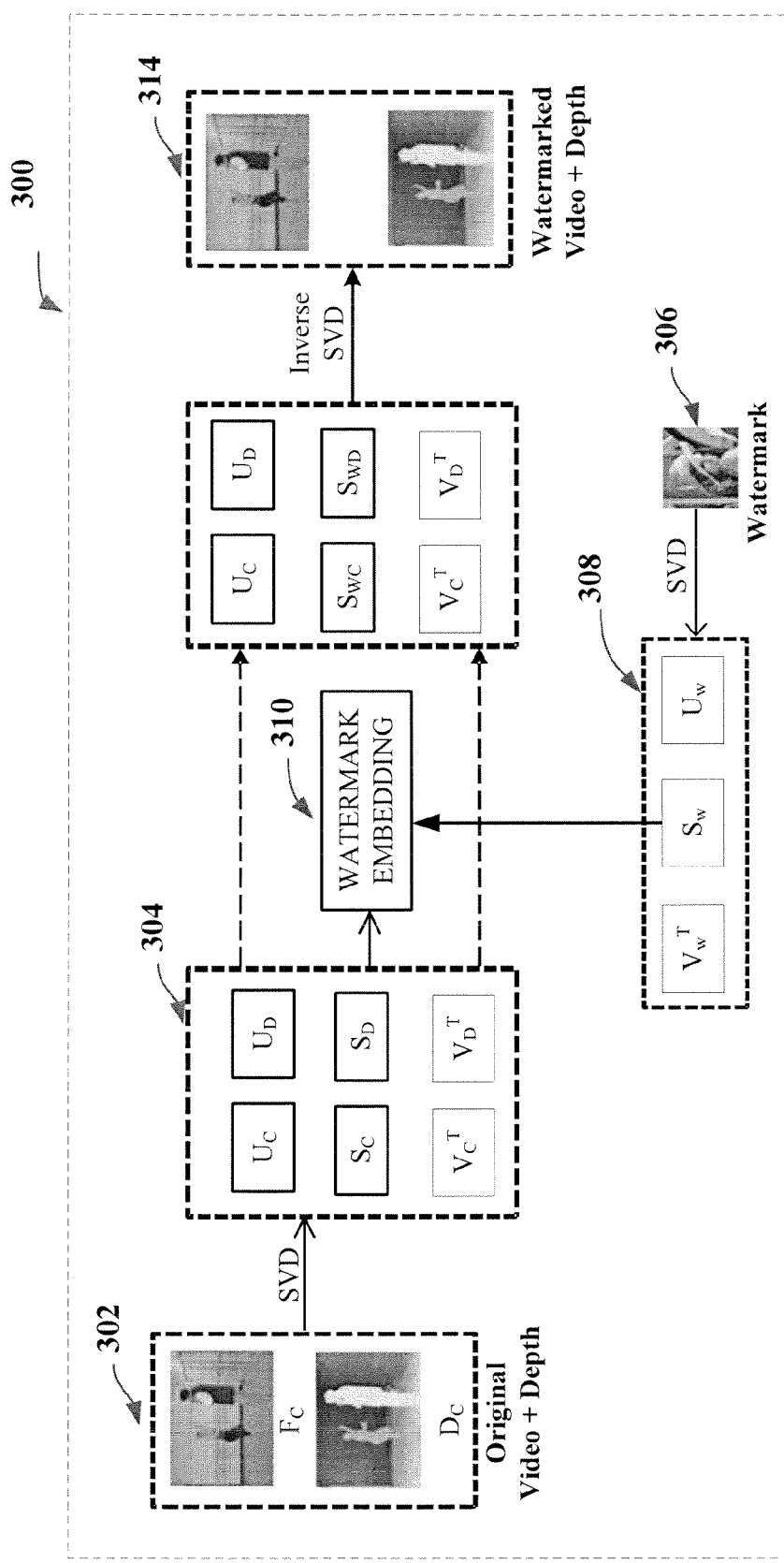
FIG. 3 is illustrative of an exemplary method to embed a watermark in a three dimensional video.

FIG. 3 is illustrative of an exemplary SVD-based watermarking method 300 to embed a watermark in a three dimensional video 302. For embedding the watermark, SVD of the center video frame, $F_C^{N \times M}$, and corresponding depth frame, $D_C^{N \times M}$, is computed 304 as:

$$F_C = U_C S_C V_C^T \quad \text{Equation III}$$

$$D_C = U_D S_D V_D^T \quad \text{Equation IV}$$

where:

$U_C$ and $V_C$ are the orthogonal matrices of center video frame $F_C$ of three dimensional video 302

$S_C$ is the diagonal matrix of center video frame $F_C$ of three dimensional video 302

$U_D$ and $V_D$ are the orthogonal matrices of depth frame $D_C$ of three dimensional video 302

$S_D$ is the diagonal matrix of corresponding depth frame $D_C$ of three dimensional video 302

The watermark $W^{n \times m}$ 306 is obtained and its SVD is computed 308 as:

$$W = U_w S_w V_w^T \qquad \text{Equation V}$$

where $U_w$ and $V_w$ are the orthogonal matrices of watermark W $S_w$ is the diagonal matrix of watermark W.

The watermark $W^{n \times m}$ is embedded 310 inside the center video frame $F_C^{N \times M}$ and corresponding depth frame $D_C^{N \times M}$ to obtain watermarked center video frame $F_{WC}^{N \times M}$ and depth $D_{WC}^{N \times M}$ frames 312 as:

$$F_{WC} = U_C (S_C + \alpha \times S_w) V_C^T = U_C S_{WC} V_C^T \qquad \text{Equation VI}$$

$$D_{WC} = U_D (S_D + \beta \times S_w) V_D^T = U_D S_{WD} V_D^T \qquad \text{Equation VII}$$

Where:

$\alpha$ and $\beta$ represents the watermark embedding strength in center video frame and corresponding depth frame respectively. Watermarked center video $F_{WC}$ and depth video $D_{WC}$ are then rendered using the method discussed in FIG. 2 to obtain the synthesized left and right video respectively.

Figure 4:
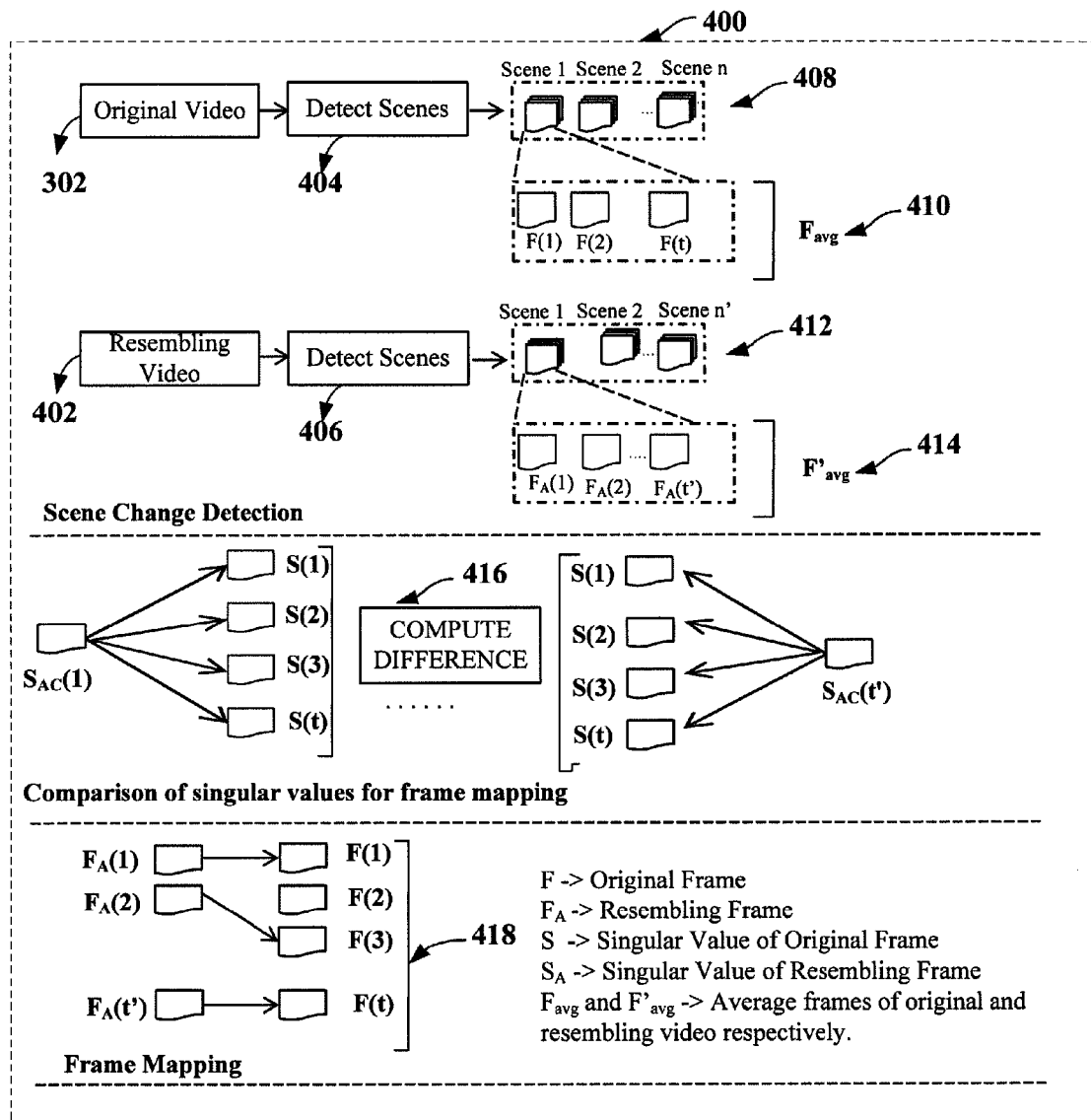
FIG. 4 is a block diagram depicting exemplary scene mapping and frame mapping.
Figure 5:
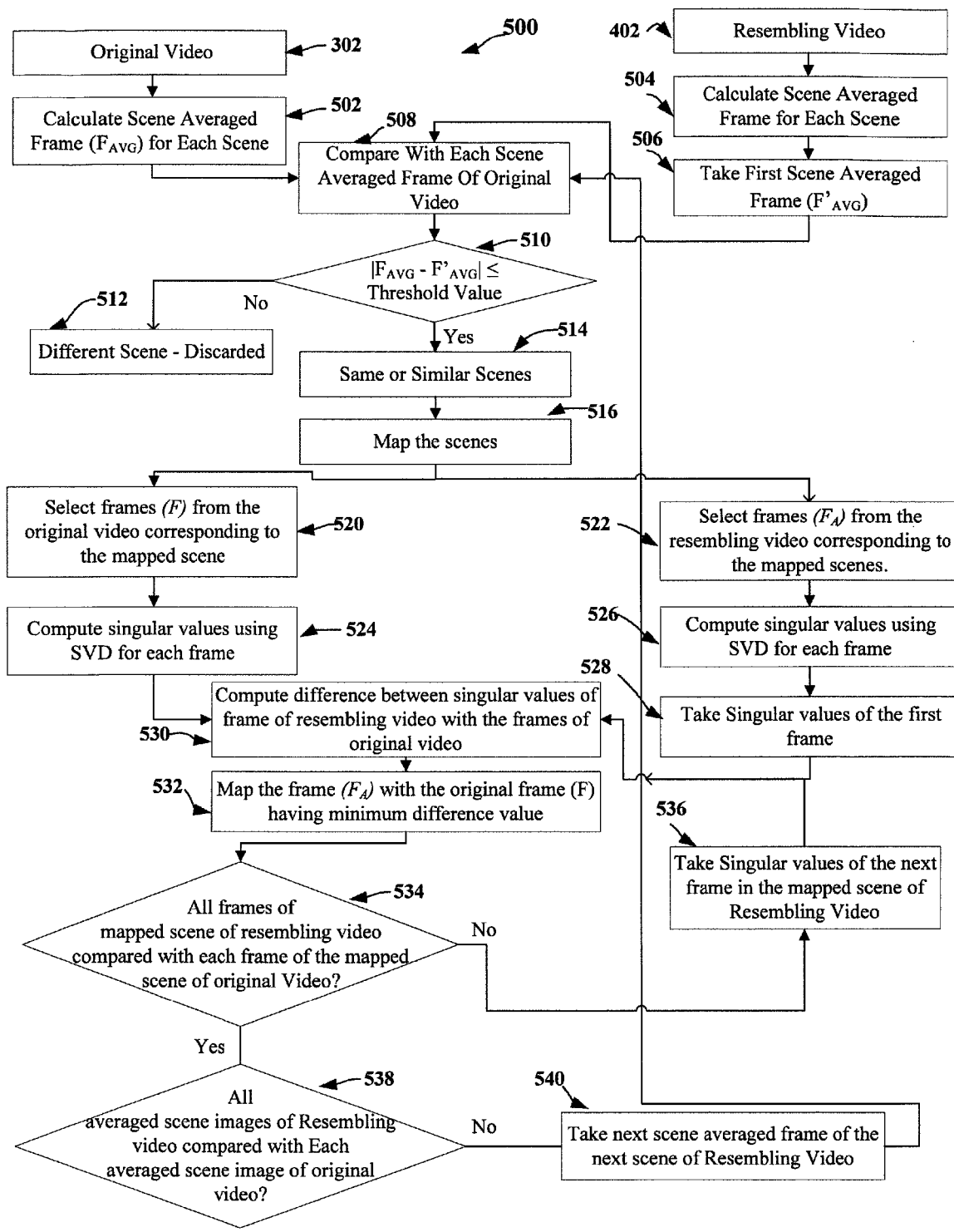
FIG. 5 is illustrative of an exemplary method to map scenes and frames as a pre-requisite to extracting a watermark from a three dimensional video.

FIG. 4 in conjunction with FIG. 5 is a block diagram depicting the scene and frame mapping process. For non-blind and semi-blind watermarking methods, method to map the scenes and frames is a pre-requisite in order to extract the watermark from a three dimensional watermarked video. Any addition or deletion of scene will lead to change in the order of the scenes. To avoid such synchronization issues, an efficient mapping process is required to map the frames of original video 302 with the resembling video 402. A scene based approach has been used for mapping the resembling frames with the original frames. Depth frame carries only distance information about the objects which are present in the center video frame while center video frame carries most information such as texture information about the three dimensional view. According to an embodiment of this technology, center video frames are used for detecting the scenes. Scenes of both the original three dimensional center video 302 and the possibly resembling three dimensional center video 402 may be detected using known scene detection methodologies. The respective videos are read and scenes are detected 404, 406. A scene change detection algorithm is applied to determine the number of scenes in the video 408, 412. Known scene change detection may be applied. Preferably, scene change detection method disclosed in patent application titled 'System for Scene Based Video Watermarking and Methods thereof' may be employed. Assume that there are n and n' scenes in the original video 408, 410 and resembling video 412, 414 respectively. A scene averaged frame 410 is used as a unique scene identifier for scene mapping. However, other unique identifiers such as Discrete Cosine Transforms (DCT) coefficients may be used. The term, scene averaged frame, as used herein, means an average of the corresponding pixels of all the frames in a given scene. Let us suppose that $F_{avg}$ 410, 502 and $F'_{avg}$ 414, 506 be the scene averaged frames of original 302 and resembling center video respectively 402. The scenes in each of the original video and the resembling video is detected and mapped against each other. The scene averaged image of the first scene of the resembling video 506 is compared with scene averaged image of each scene of the original video 508. If the difference 416 between scene averaged frame of a scene of the original video and that of the resembling video is lesser or equivalent to a preconfigured threshold value 510, then the two scenes are the same or a close match 514. If the value is more than the threshold value then the two scenes may be considered as different scenes 512. This process is repeated until the last scene of the original video 516, 538. The set of mapped scenes can be examined further for frame mapping. Frames from scenes of the original video 520 are compared with frames from corresponding mapped scenes of the resembling video 522. Singular values are computed using SVD for each frame of the mapped scenes 524, 526. The frames $F_{AC}^{M' \times N'}$ of the mapped scenes of the resembling video are decomposed into one singular matrix $S_{AC}^{N' \times M'}$ and two orthogonal matrices $U_{AC}^{N' \times M'}$ and $V_{AC}^{M' \times M'}$ as:

$$F_{AC} = U_{AC} S_{AC} V_{AC}^T \qquad \text{Equation VIII}$$

Compute the difference 416, 528, 530 between the singular values of resembling frame $S_{AC}$ with the singular values of original frames $S_C$ as:

$$\text{diff} = (\Sigma |S_{AC} - S_C(1)|, \ldots, \Sigma |S_{AC} - S_C(t)|) \qquad \text{Equation IX}$$

where:

t denotes the number of frames in the corresponding scene of original video 302.

The resembling frame for which the difference is minimum with the original frame will be the matching frame 418, 532. This is repeated until each frame of the resembling video is mapped with each frame of the original video 534, 536. Frames in resembling video with no corresponding frame match in corresponding scene of original video are discarded 538. Now, the frames have been mapped and the watermark can be extracted from the mapped frames of the resembling video. Suspected video files could be: (i) center video and corresponding depth video, (ii) center video, (iii) synthesized left view video, and (iv) synthesized right view video. Watermark is extracted from these suspected files as:

$$W'_C = U_W \left( \frac{S_{AC} - S_C}{\alpha} \right) V_W^T \qquad \text{Equation X}$$

$$W'_D = U_W \left( \frac{S_{AD} - S_C}{\beta} \right) V_W^T \qquad \text{Equation XI}$$

$$W'_L = U_W \left( \frac{S_{AL} - S_C}{\alpha} \right) V_W^T \qquad \text{Equation XII}$$

$$W'_R = U_W \left( \frac{S_{AR} - S_C}{\alpha} \right) V_W^T \qquad \text{Equation XIII}$$

where $S_{AC}$, $S_{AD}$, $S_{AL}$, and $S_{AR}$ are the singular values of the resembling center video frame, corresponding depth frame, synthesized left view video frame and synthesized right view video frame respectively.

$W'_C$, $W'_D$, $W'_L$, and $W'_R$ are the watermarks extracted from the center video frame, depth video frame, synthesized left view video frame, and synthesized right view video frame respectively.

Figure 6:
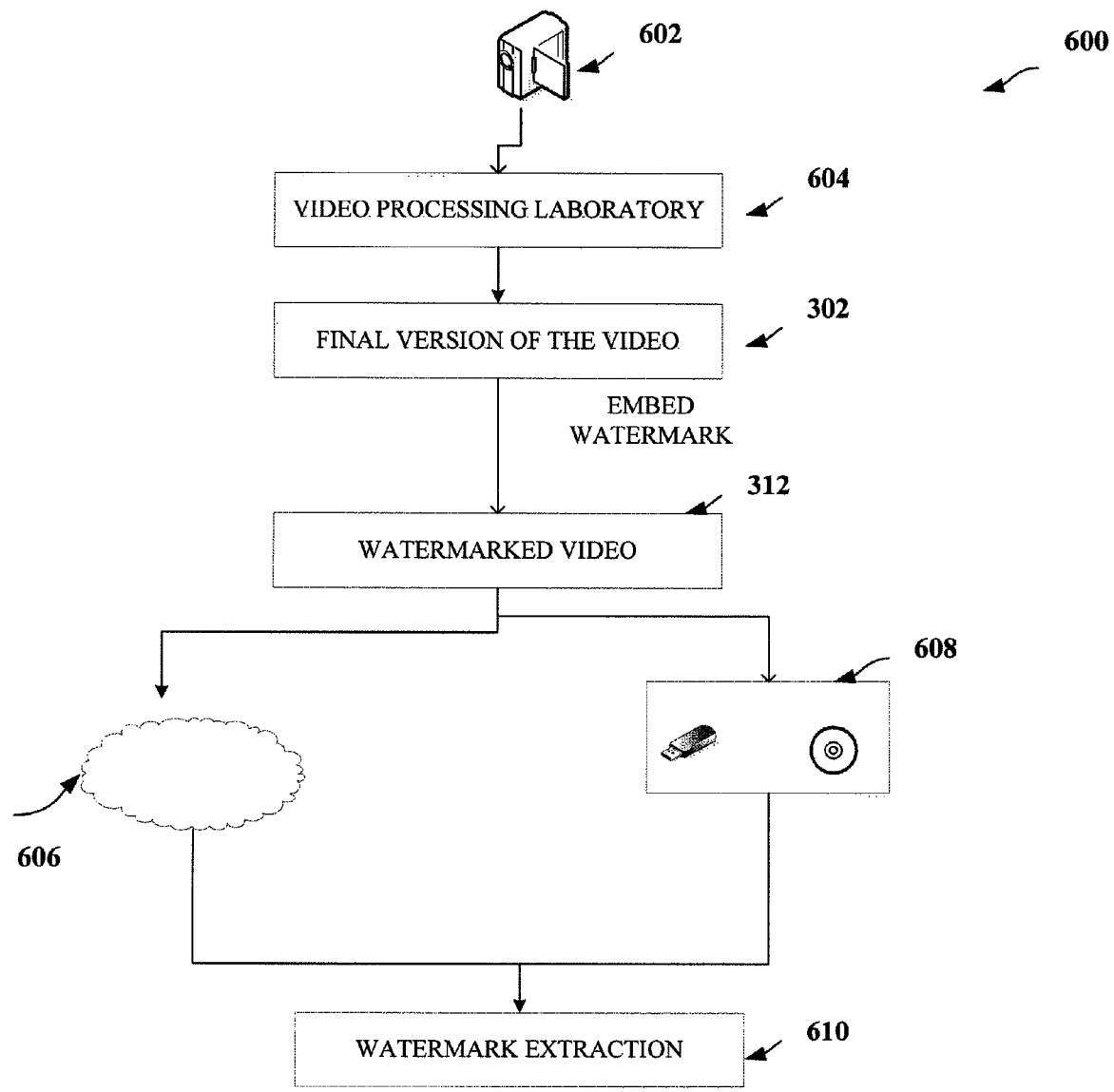
FIG. 6 is a flowchart illustrative of exemplary utility of this technology.

FIG. 6 is a flowchart illustrative of exemplary utility of this technology. A video 302, which is captured by a camera 602 may be processed inside a video processing laboratory 604. The video 302 created for an intended purpose is watermarked with the watermark information for example, owner's information. A watermark is a visible, or preferably invisible, identification data that is permanently embedded in the digital data, that is, it remains present within the data after any encoding and decoding process. The embedded watermark information can be recovered from the unauthorized copy which is created by imitating the watermarked video and can be used for protecting the digital right violations. The watermarked video 314 may be available through multiple channels to an end-user through a communication network 606 or in the form of a physical media 608 as the case maybe. In case of downloading video from Internet, a download request is sent from a computer to Internet for a video. The download reaches the Web server through a network. The Web server may be operatively connected to a server with an application 104a. An end-user downloads the video and may distribute this video to unauthorized consumers. Any suspect copy of a video may be validated for its authenticity to determine if it is an illegal copy by extracting the watermark information. The extracted watermark 610 contains the watermark information which can be used to establish digital rights.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for determining an illegitimate three dimensional video, the method comprising:
   generating by a video analyzing computing device a first scene averaged frame value for each of a plurality of scenes of an original video and a second scene averaged frame value for each of a plurality of scenes of a resembling video;
   mapping by the video analyzing computing device each of at least a subset of the scenes of the resembling video to a corresponding one of the scenes of the original video based on a comparison of at least a subset of the first scene averaged frame values and the second scene averaged frame values;
   generating by the video analyzing computing device a first singular value score for each of one or more frames of each of the subset of scenes of the resembling video and a second singular value score for each of one or more frames of the corresponding one of the scenes of the original video;
   identifying by the video analyzing computing device one or more matching ones of the one or more frames of each of the at least a subset of scenes of the resembling video based on a comparison of at least a subset of the first singular value scores and the second singular value scores; and
   extracting by the video analyzing computing device a first watermark from the identified matching frames.

2. The method of claim 1, further comprising determining by the video analyzing computing device when the resembling video is illegitimate based on a comparison of the first watermark to a second watermark associated with the original video.

3. The method of claim 1, wherein each of the at least a subset of the scenes of the resembling video is mapped to the corresponding one of the scenes of the original video when a difference between the respective first and second scene averaged frame values is less than a predetermined threshold.

4. The method of claim 1, wherein the identified matching frames of the resembling video each have an associated first singular value score that is least different than one of the second singular value scores associated with one of the frames in the respective corresponding one of the scenes of the original video.

5. The method of claim 1, further comprising displaying by the video analyzing computing device at least the identified matching frames.

6. A video analyzing computing device, comprising a processor and a memory coupled to the processor which is configured to be capable of executing programmed instructions comprising and stored in the memory to:
   generate a first scene averaged frame value for each of a plurality of scenes of an original video and a second scene averaged frame value for each of a plurality of scenes of a resembling video;
   map each of at least a subset of the scenes of the resembling video to a corresponding one of the scenes of the original video based on a comparison of at least a subset of the first scene averaged frame values and the second scene averaged frame values;
   generate a first singular value score for each of one or more frames of each of the subset of scenes of the resembling video and a second singular value score for each of one or more frames of the corresponding one of the scenes of the original video;
   identify one or more matching ones of the one or more frames of each of the at least a subset of scenes of the resembling video based on a comparison of at least a subset of the first singular value scores and the second singular value scores; and
   extract a first watermark from the identified matching frames.

7. The video analyzing computing device of claim 6, wherein the processor coupled to the memory is further configured to be capable of executing at least one additional programmed instruction comprising and stored in the memory to determine when the resembling video is illegitimate based on a comparison of the first watermark to a second watermark associated with the original video.

8. The video analyzing computing device of claim 6, wherein each of the at least a subset of the scenes of the resembling video is mapped to the corresponding one of the scenes of the original video when a difference between the respective first and second scene averaged frame values is less than a predetermined threshold.

9. The video analyzing computing device of claim 6, wherein the identified matching frames of the resembling video each have an associated first singular value score that is least different than one of the second singular value scores associated with one of the frames in the respective corresponding one of the scenes of the original video.

10. The video analyzing computing device of claim 6, wherein the processor coupled to the memory is further configured to be capable of executing at least one additional programmed instruction comprising and stored in the memory to display at least the identified matching frames.

11. A non-transitory computer readable medium having stored thereon instructions for testing a firewall comprising executable code which when executed by a processor, causes the processor to perform steps comprising:
   generating a first scene averaged frame value for each of a plurality of scenes of an original video and a second scene averaged frame value for each of a plurality of scenes of a resembling video;

mapping each of at least a subset of the scenes of the resembling video to a corresponding one of the scenes of the original video based on a comparison of at least a subset of the first scene averaged frame values and the second scene averaged frame values;

generating a first singular value score for each of one or more frames of each of the subset of scenes of the resembling video and a second singular value score for each of one or more frames of the corresponding one of the scenes of the original video;

identifying one or more matching ones of the one or more frames of each of the at least a subset of scenes of the resembling video based on a comparison of at least a subset of the first singular value scores and the second singular value scores; and extracting a first watermark from the identified matching frames.

12. The non-transitory computer readable medium of claim 1, further having stored thereon at least one additional instruction that when executed by the processor cause the processor to perform at least one additional step comprising determining when the resembling video is illegitimate based on a comparison of the first watermark to a second watermark associated with the original video.

13. The non-transitory computer readable medium of claim 11, wherein each of the at least a subset of the scenes of the resembling video is mapped to the corresponding one of the scenes of the original video when a difference between the respective first and second scene averaged frame values is less than a predetermined threshold.

14. The non-transitory computer readable medium of claim 11, wherein the identified matching frames of the resembling video each have an associated first singular value score that is least different than one of the second singular value scores associated with one of the frames in the respective corresponding one of the scenes of the original video.

15. The non-transitory computer readable medium of claim 11, further having stored thereon at least one additional instruction that when executed by the processor cause the processor to perform at least one additional step comprising displaying at least the identified matching frames.

* * * * *